(12) United States Patent
Phelan (10) Patent No.: US 7,242,403 B2
(45) Date of Patent: Jul. 10, 2007

(54) GRAPHICAL DISPLAY OF MULTIPLE RELATED VARIABLES

(76) Inventor: Timothy Phelan, 2516 West 7th Avenue, No. 1, Vancouver, BC (CA) V6K 1Y9

( * ) Notice: Subject to any disclaimer, the term of this patent is extended or adjusted under 35 U.S.C. 154(b) by 35 days.

(21) Appl. No.: 10/943,898

(22) Filed: Sep. 20, 2004

(65) Prior Publication Data

US 2006/0061572 A1 Mar. 23, 2006

(51) Int. Cl.
*G06T 11/20* (2006.01)
(52) U.S. Cl. .................................................. 345/440
(58) Field of Classification Search ................ 345/440, 345/440.1
See application file for complete search history.

(56) References Cited

U.S. PATENT DOCUMENTS

| | | | |
|---|---|---|---|
| 1,935,402 A | 11/1933 | Krijanovsky | |
| 2,576,149 A | 11/1951 | Sharp | |
| 2,991,934 A | 7/1961 | Morton | |
| 3,132,800 A | 5/1964 | Berger | |
| 3,559,881 A | 2/1971 | Maison | |
| 4,698,624 A * | 10/1987 | Barker et al. | 345/157 |
| 4,734,867 A | 3/1988 | Janin et al. | |
| 5,307,455 A | 4/1994 | Higgins et al. | |
| 5,408,596 A | 4/1995 | Nonaka et al. | |
| 5,912,674 A | 6/1999 | Magarshak | |
| 6,188,969 B1 | 2/2001 | Minor | |
| 6,211,887 B1 * | 4/2001 | Meier et al. | 345/440 |
| 6,580,439 B1 | 6/2003 | Ardis et al. | |
| 6,661,438 B1 * | 12/2003 | Shiraishi et al. | 715/835 |
| 6,670,972 B2 * | 12/2003 | Grieve et al. | 715/772 |
| 6,734,848 B2 * | 5/2004 | Bires | 345/419 |
| 2002/0143472 A1 | 10/2002 | Mutter | |
| 2004/0012589 A1 * | 1/2004 | Etgen et al. | 345/440 |

FOREIGN PATENT DOCUMENTS

| | | |
|---|---|---|
| DE | 1774130 | 4/1968 |
| EP | 026959 | 4/1981 |
| EP | 358835 | 3/1990 |
| WO | WO91/17511 | 11/1991 |
| WO | WO00/60424 | 10/2000 |

OTHER PUBLICATIONS www.mic-d.com/java/nomograph, date : Aug. 13, 2004.

(Continued)

*Primary Examiner*—Kee M. Tung
*Assistant Examiner*—Aaron M. Richer
(74) *Attorney, Agent, or Firm*—David A. Guerra (57) ABSTRACT

A system and method for graphically representing on a computer system the relationship between a plurality of variables related by an equation. A graph having a plurality of axes is displayed on a display device and each axis represents one of the variables. Grips are located on each of the axes to indicate the value of the variable represented by the axis. A user can lock one of the grips on its axis and then select one of the unlocked grips and slide the selected grip to a new position indicating a new value on the axis. The remaining grip will slide in relation to the grip being moved by the user and indicate the value of the remaining variable.

21 Claims, 9 Drawing Sheets

OTHER PUBLICATIONS www.ece.rochester.edu/~jones/demos/nomograph.html, date : Aug. 13, 2004.
www.hbroussais.fr/Broussais/InfoMed/Nomogram.html, date : Aug. 13, 2004.
www.ece.rochester.edu/~jones/NomoDevel/nomopage.htm, date : Aug. 13, 2004.
www.coacs.com/software/published_titles/products/lsc/lungVolumes.htm, date : Aug. 13, 2004.
www.statcoder.com, date : Aug. 13, 2004.
www.wattsradiant.com/radiantworks.html, date : Aug. 13, 2004.
www.epa.gov/ttn/emc/software.html, date : Aug. 13, 2004.

* cited by examiner

GRAPHICAL DISPLAY OF MULTIPLE RELATED VARIABLES

This invention is in the field of interactive interfaces and more specifically relates to an apparatus and method of graphically representing the relationship between a plurality of variables that are related by an equation.

BACKGROUND

Traditionally, nomographs have been used to solve multivariable equations for an unknown variable when two or more variables are known. A traditional nomograph has a number of scaled axes, each axis representing one of the variables in an equation. The axes of a traditional nomograph are in parallel and each of these scaled axes are calibrated and arranged so that a straight line drawn through all of the axes will intersect a value on each axis that will satisfy the equation. When two or more variables of the equation are known, a traditional nomograph can be used to solve for the third variable by drawing a line through the axes representing two known variables intersecting the values of the two known variables. The line will then intersect the remaining axis representing the unknown variable and this intersection will indicate the value of the unknown variable.

Before the advent of computers and calculators nomographs were popular because they allowed a person to determine an unknown variable of an equation without doing extensive manual calculations. All a person had to do to determine a third related value using a traditional nomograph was to lay a ruler on the nomograph so that the ruler intersect the two know values and read the value where the ruler crosses the remaining axis. These traditional nomographs were especially useful to allow lay people to "solve" complex equations without requiring mathematical calculations.

Although nomographs are easy to use and do not require any calculations, they are often labor intensive to construct because each axis must be calibrated and located relative to the other axes.

Another disadvantage of traditional nomographs is that the answers found using a nomograph often lacks precision. Depending on the size and accuracy of the scale on the axis, the precision of the resulting answer will be dependent upon how well the two known variables are intersected and to what degree the resulting answer can be read. Also, if a variable has units of measurement, one axis is required for each different unit of measure.

With the advent of pocket calculators and computers, nomographs are no longer needed to solve complex equations, it is much simpler and more precise to use a simple computer program to solve an equation rather then rely on how accurate a value can be read off an intersection of an axis. As a result, nomographs for solving equations have fallen out of fashion. Computers and pocket calculators are more than up to the task of doing the calculations necessary to solve for a related unknown variable when the other variables are known and can often do it just as fast and with much greater precision.

While computers and pocket calculators can solve a multivariable equation for an unknown variable just as fast, if not faster, and with more precision than a traditional nomograph, the calculations and relationships between the variables remain invisible to the user. The user is not able to see a visual representation of the relationship of the variables and is not easily able to determine the sensitivity of the equation to the different variables. Also, using a computer to solve for an unknown variable in an equation does not easily allow a user to see how altering the different variables of the equation can affect the relationship of the related variables and often makes it much harder for a user to "tweak" the different variables to arrive at satisfactory values for the equation.

SUMMARY OF THE INVENTION

It is an object of the present invention to provide a system and apparatus that overcomes problems in the prior art.

The present invention provides, in a first embodiment, a method of providing a graphical representation of the relationship between a plurality of related variables, the method comprising: displaying on a display device of a computer system, a first axis, a second axis and a third axis, each of the axes representing a numerical scale; on the display device, displaying a first grip indicating on the first axis the value of a first variable, a second grip indicating on the second axis the value of a second variable, and a third grip indicating on the third axis the value of a third variable, wherein the grips are oriented at vertices of a triangle; receiving fixed variable input from a user locking the first grip such that the value of the first variable is fixed; receiving variable adjustment input from the user comprising moving a second grip from a first position on the second axis to a second position on the second axis; using a value indicated by the second grip on the second axis as the value of the second variable to calculate a new value of the third variable; and displaying on the display device the third grip at a new position on the third axis such that the third grip indicates the new value of the third variable.

The present invention provides, in a second embodiment, an apparatus for displaying a graphical representation of the relationship between a plurality of related variables, the apparatus comprising: a processing unit; a memory storage device operatively connected to the processing unit; an input device operatively connected to the processing unit wherein the input device is operative to receive input from a user and transmit the input to the processing unit; a display device operatively connected to the processing unit and operative to display an interface, the interface comprising: a first axis, a second axis and a third axis, each of the axis representing a numerical scale; and a first grip indicating on the first axis the value of a first variable, a second grip indicating on the second axis the value of a second variable, and a third grip indicating on the third axis the value of a third variable, wherein the grips are oriented at vertices of a triangle; and a program module stored in the memory storage device operative for providing instructions to the processing unit, the processing unit responsive to the instructions of the program module. The processing unit is operative to: receive fixed variable input from the input device locking the first grip such that the value of the first variable is fixed; receive variable adjustment input from the input device comprising moving a second grip from a first position on the second axis to a second position on the second axis; calculate a new value of the third variable using a value indicated by the second grip on the second axis as the value of the second variable; and display on the display device the third grip at a new position on the third axis such that the third grip indicates the new value of the third variable.

The invention is directed to a method and apparatus for graphically representing on a computer system, the relationship between a plurality of variables related by an equation. In one embodiment a graph is displayed on a screen. The graph represents the relationship between the variables where each variable is represented by an axis of the graph. A grip is located on each axis and serves to indicate the value of the variable represented by that axis. The grips are arranged so that the values they indicate on each of their axes will solve the equation.

A user can select one of the grips to be locked. Locking the grip will fix the value of the variable indicated by that grip and the grip cannot be moved by the user until the user unlocks the grip by locking another grip. By locking the grip the user is indicating that the variable is known. The user must lock one grip for equations with three variables and two grips for equations with four variables. The user would typically select either of the unlocked grips with a mouse and then use the mouse to slide the selected grip along its axis. As the grip is slid by the user, the computer system will move the remaining grip in relation to the grip being moved by the user. As the user slides the grip, the grip will move to a new position and indicate a new value for the variable represented by the axis the moving grip is located on. The system will then use the value indicated by the sliding grip at its new position and the fixed value of the locked grip to calculate a new value for the variable that is represented by the remaining grip. When the system has calculated the value of the variable that is represented by the remaining grip, the system will then move the remaining grip to a new position indicating this new value.

By repeatedly determining the value indicated by the sliding grip at different positions as the grip is slid along, the system can repeatedly calculate a new value for the remaining grip and move the remaining grip to a new position on its axis for each of the different positions of the sliding grip. In this manner, the remaining grip will appear to move along its axis in relation to the grip being moved by the user.

A user can select any of the grips to be locked and then move any of the unlocked grips with the mouse.

In a further embodiment of the invention, along with graphically representing the relationship between the variables related by an equation, the present invention also allows a user to convert any of the values of the variables represented by the axes into new units.

In a further embodiment of the invention, the numerical values of the variables represented by the axes will be displayed to the user.

In a further embodiment of the invention, the scales represented by the axes can be adjusted by the user selecting whether to increase or decrease an upper limit or lower limit of the scale shown on one of the axis, or by selecting one number on the scale and moving the selected number to a new location.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
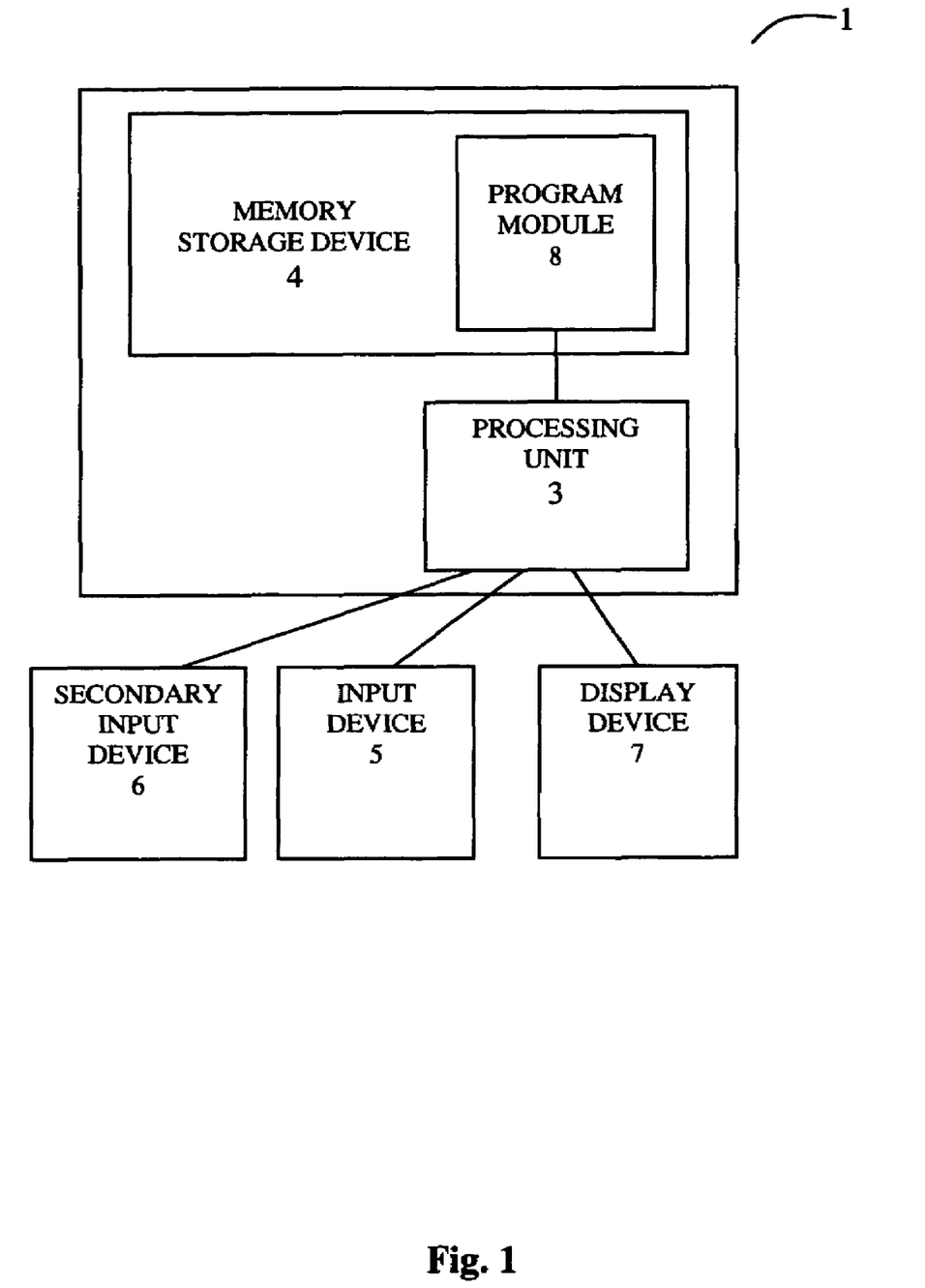
FIG. 1 is a schematic of a typical computer system suitable for supporting the operation of the method of the present invention.

FIG. 1 illustrates a conventional computer system 1 suitable for supporting the operation of the method of the present invention. The conventional computer system 1 typically comprises: a processing unit 3; a memory storage device 4; an input device 5; a secondary input device 6; a display device 7; and a program module 8.

The processing unit 3 can be any processing unit that is typically known in the art with the capacity to run the program and is operatively connected to the memory storage device 4. The input device 5 can be any suitable device suitable for inputting data into the computer system 1, such as a keyboard, mouse or data port (such as a network connection) and the input device is operatively connected to the processing unit 3 and operative to allow the processing unit 3 to receive information inputted from the input device 5. Typically, a conventional computer system 1 will also have a secondary input device 6, such as a mouse, that is also operatively connected to the processing unit 3 and operative to allow the processing unit 3 to receive information through a means different from the input device 5. The display device 7 can be any suitable device coupled to the processing unit 3 and operative for displaying data. The program module 8 is stored in the memory storage device 4 and operative to provide instructions to the processing unit 3. The processing unit 3 is responsive to the instructions of the program module 8.

Although other internal components of a computer system 1 are not illustrated, those of ordinary skill in the art will appreciate that many more components and interconnections between them are well known and can be used. As well, the computer system 1 need not be limited to only one computer system and may comprise a network of connected computer systems.

Figure 2:
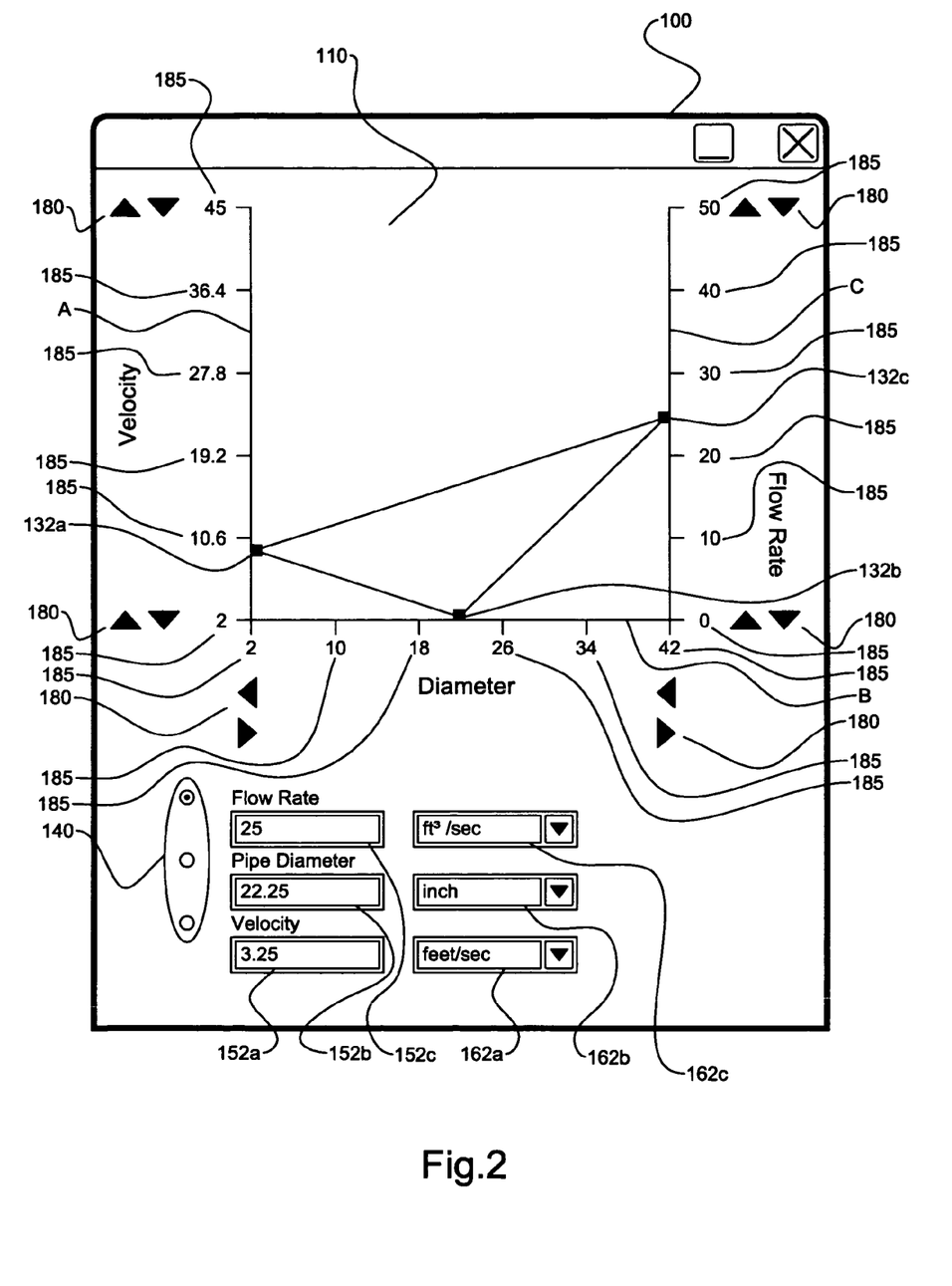
FIG. 2 is an interface screen for a program in accordance with the present invention.

FIG. 2 illustrates the interface of a program in accordance with the present invention. The interface 100 comprises: a graph 110, axes A, B, C; corresponding grips 132a, 132b, 132c; variable fields 152a, 152b, 152c; and variable unit selection menus 162a, 162b, 162c. The interface 100 also comprises fixed variable buttons 140, spin buttons 180 and axis labels 185.

The graph 110 visually represents the relationship between three variables. For the graph 110 represented in FIG. 2, the three variables are related by the equation:

Flow=Area×Velocity

Those skilled in the art will appreciate that different equations with different variables can also be graphically represented by the present invention.

Axis A, axis B and axis C each represent one of the variables of the equation. Each of the axes is a scale indicating a range of values for the represented variable. Each axis begins at a lower limit and extends to an upper limit. Along each axis, axis labels 185, that indicate numerical values that fall within the range of values indicated by the axis, are displayed. Axis A and axis C are in parallel and axis B is perpendicular to axis A and axis C.

Using the example equation above, FIG. 2 illustrates a display of the invention. Grip 132a is located on axis A and indicates the value of the variable "flow rate" represented by axis A. Grip 132b is located on axis B and indicates the value of the variable "pipe diameter" represented by axis 122b. Grip 132c is located on axis C and indicates a value of the variable "velocity" represented by axis C. The interface 100 also displays lines connecting grips 132a, 132b, and 132c.

The interface 100 displays the values of the variables of the equation. A user using interface 100 is able to see the numerical value of the variables in addition to seeing their graphical representation on the graph 110. Variable field 152a displays the numerical value of the variable "velocity" represented by axis A and indicated by grip 132a, variable field 152b displays the numerical value of the variable "pipe diameter" represented by axis B and indicated by grip 132b and variable field 152c displays the value of the variable "flow rate" represented by axis 122c and indicated by grip 132c.

The interface 100 displays to the user the units the value of each of the variables is in and allows the user to convert the value of the variables to different units. Variable unit selection menu 162a displays the units the variable represented by axis A is in. For the example of the interface 100 illustrated in FIG. 2, variable selection menu 162a indicates that the "velocity" variable is in units of feet/second. Variable selection menu 162b displays the units the variable represented by axis B is in. For the example of the interface 100 illustrated in FIG. 2, variable selection menu 162b indicates that the "pipe diameter" variable is in units of inches. Variable selection menu 162c displays the units the variable represented by axis C is in. For the example of the interface 100 illustrated in FIG. 2, variable selection menu 162c indicates that the "flow rate" variable is in units of cubic feet per second. Each of the variable selection menus are a drop down menu that when the user selects the drop down menu, the user will be presented with a number of different options for units the value can represented in.

Interface 100 also allows a user to lock a grip such that the value represented by the locked grip is fixed. The fixed variable buttons 140 allow a user to select one of the three variables as a known variable and locks the grip and fixes the value of the variable.

The spin buttons 180 typically comprise an up and down arrow button. The spin buttons 180 are located at the upper limit and lower limit of each of axis A, axis B and axis C. The user can select one of the spin buttons 180 to indicate that the user wants one of the axis's upper limit or lower limit increased or decreased.

Figure 3:
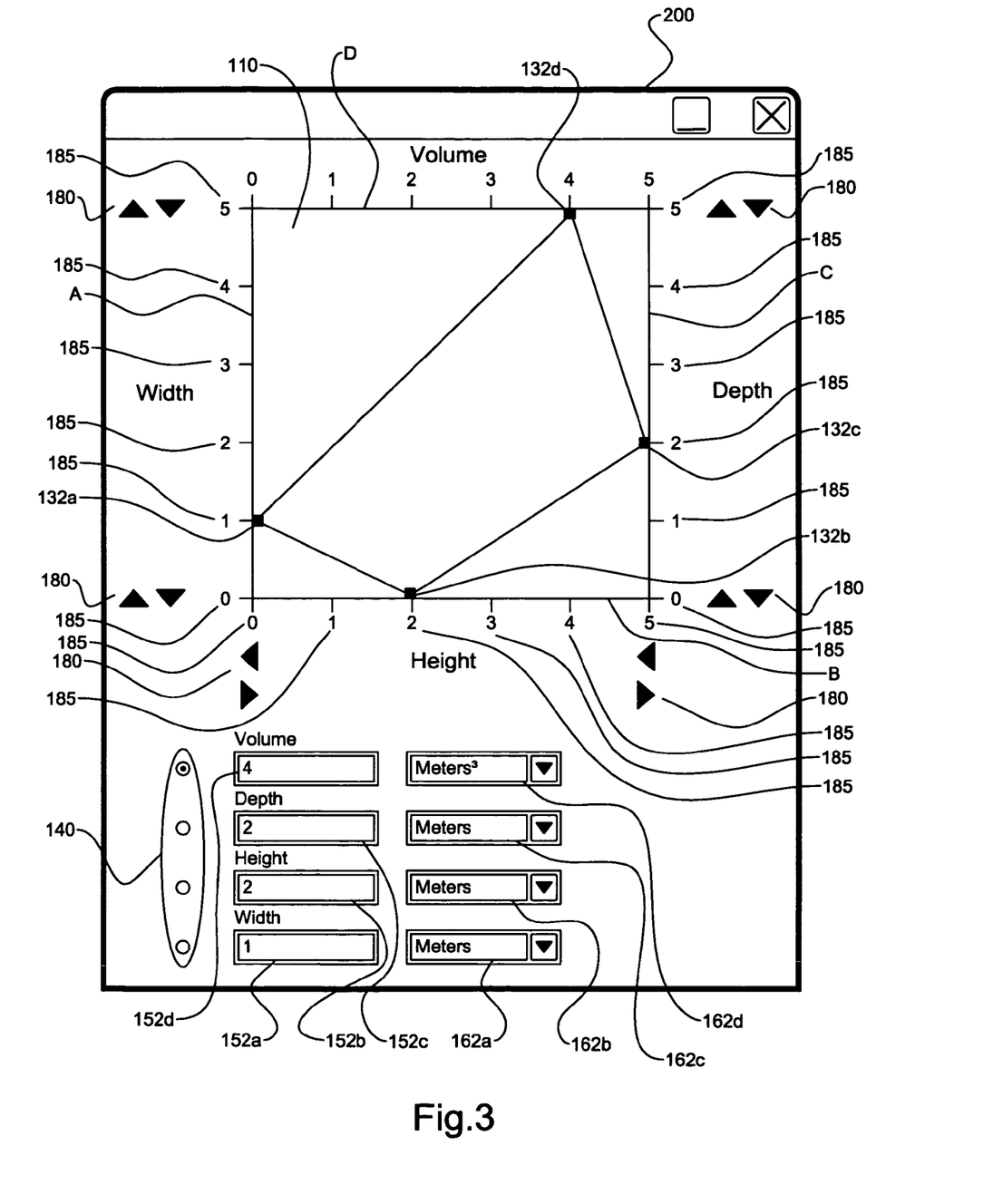
FIG. 3 is another embodiment of an interface screen for a program in accordance with the present invention.

FIG. 3 illustrates another embodiment of an interface of a program in accordance with the present invention where the interface 200 graphically represents an equation with four variables. The interface 200 comprises: a graph 110; axes A, B, C, D; corresponding grips 132a, 132b, 132c, 132d; variable fields 152a, 152b, 152c, 152d and variable unit selection menus 162a, 162b, 162c, 162d. The interface 200 also comprises fixed variable buttons 140, spin buttons 180 and axis labels 185.

Interface 200 graphically represents the four variables of the equation for the volume of a box:

Width×Height×Depth=Volume.

As it will be appreciated by those skilled in the art, the present invention could be used to graphically represent an equation with any number of variables that can be displayed in a practical manner.

Figure 4:
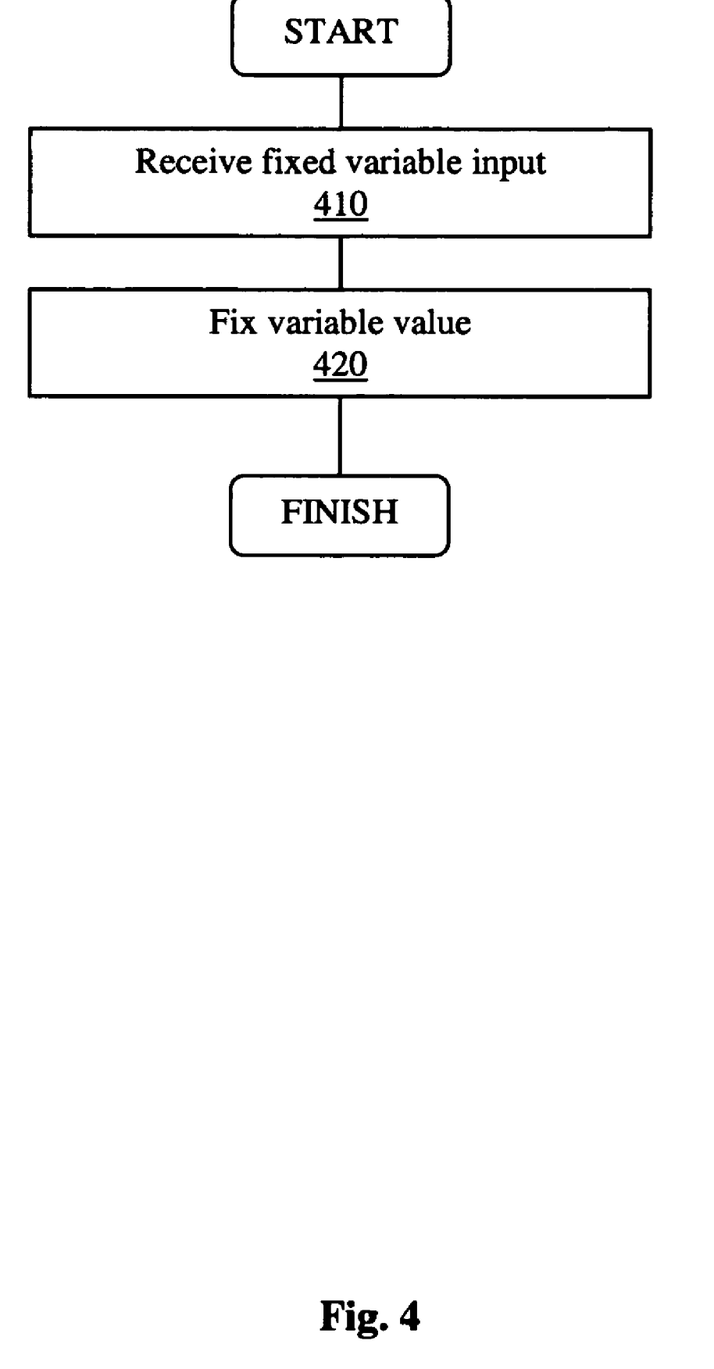
FIG. 4 is a flowchart illustrating the steps of a method in accordance with the present invention for selecting a known variable and locking a grip indicating the known variable.

FIG. 4 is a flow chart illustrating the steps of a method for selecting a known variable from a plurality of variables related by an equation and locking a grip indicating the known variable to fix the value of the selected variable. The steps of the method would be implemented using a conventional computer system such as computer system 1 illustrated in FIG. 1 and include receiving fixed variable input 410 and fixing the value of a locked variable 420.

The computer system 1 receives fixed variable input 410. Typically, a user will input the fixed variable input by using either the input device 5 or a secondary input device 6 to select one of the variables that is known. If an interface such as interface 100 illustrated in FIG. 2 is used, the user would select one of the fixed variable buttons 140 to indicate which of the variables the user would like to lock.

The processing unit 3 will then fix the value of the locked variable 420 indicated by the fixed variable input. The value of the variable will remain fixed and a user will not be able to select and move the grip on the axis representing the fixed variable.

Figure 5:
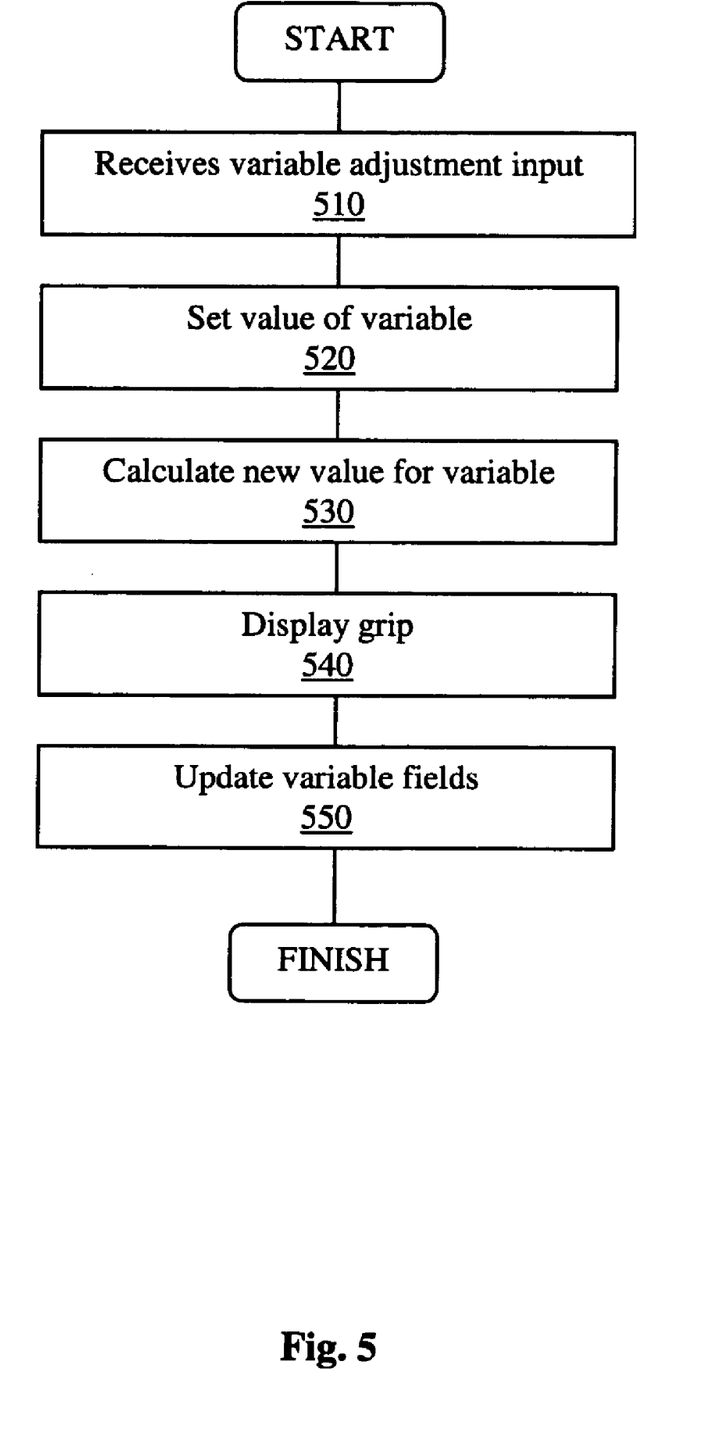
FIG. 5 is a flow chart illustrating the steps of a method in accordance with the present invention for solving for a new value of a variable.

FIG. 5 is a flow chart illustrating the steps of a method for solving for a new value of a variable from a plurality of variables related by an equation. When the method begins, a first variable has been locked using the method illustrated in FIG. 3. If the equation that relates the variables contains more than three variables, more than one of the variables must be locked using the method illustrated in FIG. 4, before this method begins. Of the plurality of variables, all of the variables except two must be locked before this method is started. The steps of the method would be implemented using a conventional computer system such as computer system 1 illustrated in FIG. 1 and include: receiving variable adjustment input 510; setting a value of a second variable 520; calculating a new value of a third variable 530; displaying a third grip 540; and updating variable fields 550.

The computer system 1 receives variable adjustment input from a user 510. The variable adjustment input is inputted by a user using the input device 5 or the secondary input device 6 and would typically be the user selecting the second grip and sliding the second grip along the second axis from a first position to a second position on the second axis. If the interface 100 illustrated in FIG. 2 is used, the user would select one of grips 132a, 132b or grip 132c that has not been locked by the user. If for example, the user selected the grip 132a, the user would then slide the grip 132a along axis A.

The processing unit 3 receives the variable adjustment input from the input device 5 or the secondary input device 6 and uses the variable adjustment input to display, on the display device 7, the second grip at the second position along the second axis. The second grip will now indicate a different value on the second axis.

The value of the second variable is set 520. The processing unit 3 will set the value of the second variable to be the value indicated by the second grip at its second position on the second axis.

A new value for the third variable is calculated 530. The processing unit 3 will use the value of the first variable which is fixed and the value set for the second variable to calculate a new value for the third variable. The processing unit 3 will use the equation defining the relationship between the variables to solve for the new value of the third variable.

The third grip is displayed 540 at a new position. The processing unit 3 redisplays, on the display device 7, the third grip at a new position on the third axis. The new position of the third grip will indicate the new value for the third variable.

If the new position of the third axis is outside the limits of the third axis, the processing unit 3 might display on the display device 7 the third axis with a new upper or lower limit so that the new position of the third grip is located within the adjusted limits of the third axis.

The variable fields are updated 550. The processing unit 3 displays on the display device 7 the values of the three variables and the method will end. If the interface 100 illustrated in FIG. 2 is used, the new values of the three variables will be displayed in the variable fields 152*a*, 152*b* and 152*c*.

The method illustrated in FIG. 5 is typically repeated numerous times as the user slides the second grip along the axis from an initial position to a final position. The movement of the second grip from the first position to the second position in the method of FIG. 4 only moves the second grip one increment of the distance between the initial position and the final position. Because the method illustrated by the flowchart in FIG. 4 is repeated in quick repetitions as the user slides the second grip between multiple increments beginning with a first position and ending with a second position along the second axis to a final position, the third grip will appear to the user to be sliding along the third axis relative to the sliding of second grip.

Figure 6:
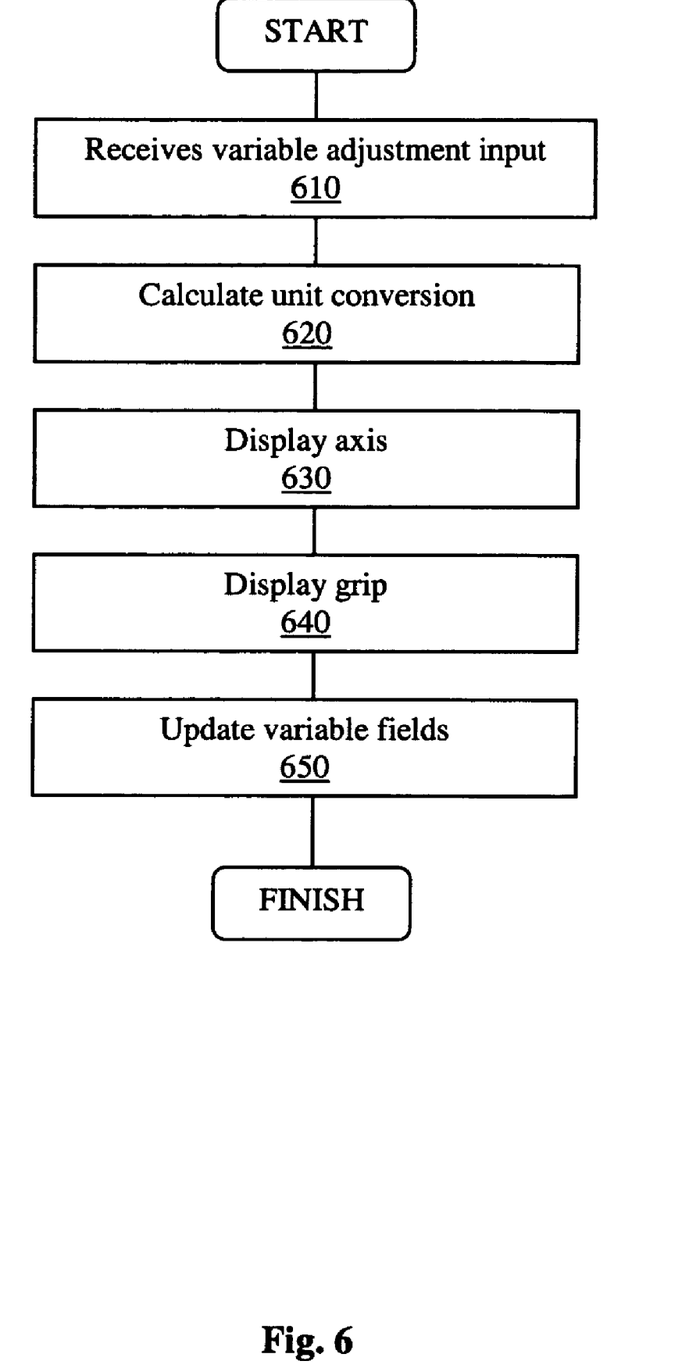
FIG. 6 is a flow chart illustrating the steps of a method in accordance with the present invention for converting the units of a known variable from a first measurement unit to a second measurement unit.

FIG. 6 is a flow chart illustrating the steps of a method for converting the units of a known variable from a first measurement unit to a second measurement unit. The steps of the method would be implemented using a conventional computer system such as computer system 1 illustrated in FIG. 1 and include: receiving variable unit conversion input 610; calculating a converted value for a selected variable 620; displayed an axis representing the selected variable 630; displayed a grip on the axis 640; and updating a variable field 650.

The computer system 1 receives variable unit conversion input from the user 610. The variable unit conversion input is inputted by a user using the input device 5 or the secondary input device 6. To input the variable unit conversion input, the user will select one of the variables with a value in first measurement units that the user would like to convert into second measurement units and selects the second measurement units the user wishes the variable to be converted into. For the interface 100 illustrated in FIG. 2, the user would input the variable unit conversion input by selecting one of the variable unit selection menus 162*a*, 162*b* or 162*c* and selecting from the drop list of units the new units the user would like the value of the selected variable converted into.

The unit conversion is calculated 620. The processing unit 3 converts the value of the selected variable from the first measurement units to the second measurement units to get a converted value.

The axis representing the selected variable is displayed 630. The processing unit 3 will redisplay the axis representing the selected variable on the display device 7. Because the selected variable represented by the axis has been converted into the second measurement units, the scale represented by the axis will change. The axis is redisplayed on the display device 7 showing the proper scale for the new units.

The grip on the axis is displayed 640. The processing unit 3 displays the grip on the axis so that the grip indicates the converted value of the selected variable.

The variable field for the converted variable is updated 650. The processing unit 3 will update the variable field to display on the display device 7 the converted value. If the interface 100 illustrated in FIG. 2 is used, the processing unit 3 will display in the variable field 152*a*, 152*b* or 152*c* (depending on which variable field corresponds to the selected variable) the converted value.

Figure 7:
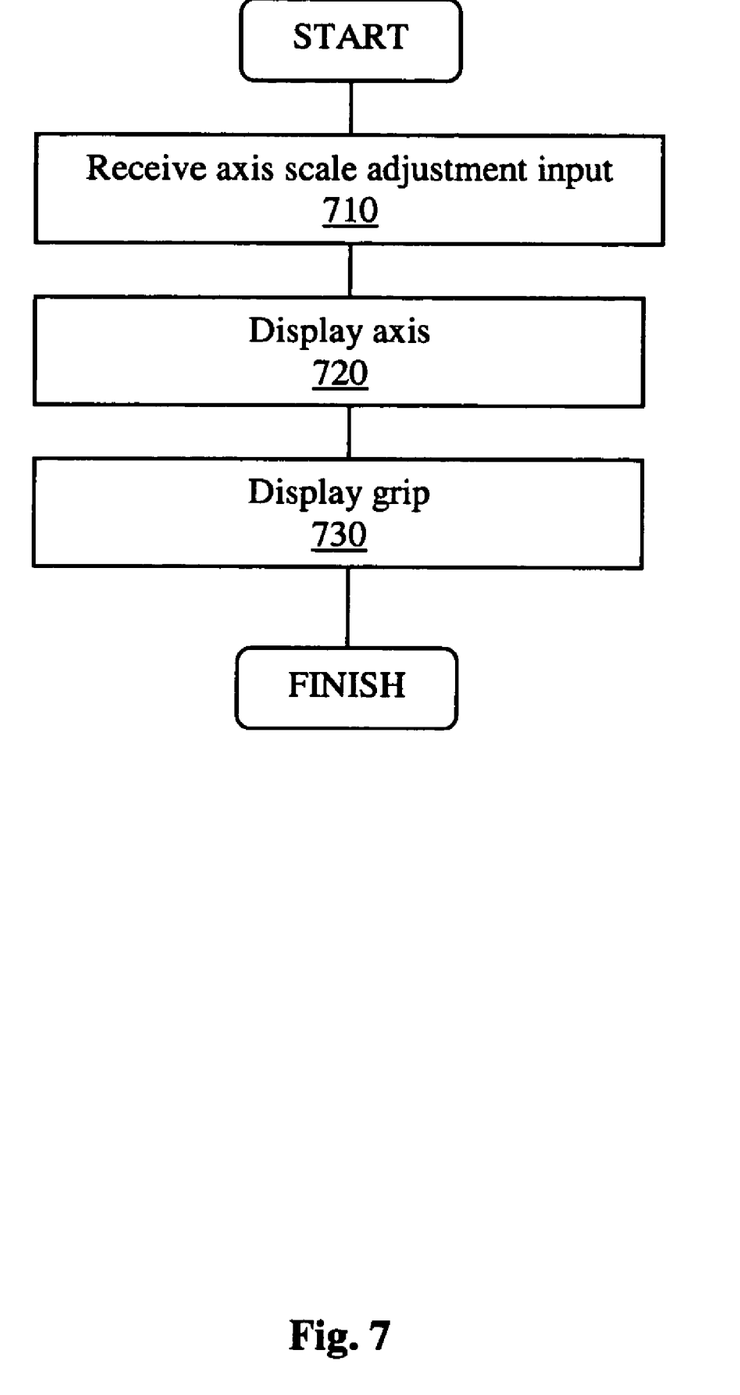
FIG. 7 is a flow chart illustrating the steps of a method in accordance with the present invention for adjusting the scale of an axis.

FIG. 7 is a flow chart illustrating the steps of a method for adjusting the scale of an axis. The steps of the method would be implemented using a conventional computer system such as computer system 1 illustrated in FIG. 1 and include: receiving axis scale adjustment input 710; displaying a selected axis 720; and displaying a grip on the selected axis 730.

The computer system 1 receives axis scale adjustment input 710. The axis scale adjustment input is a selected axis and an indication whether to increase or decrease the lower limit or upper limit of the selected axis. For example, using the interface 100 illustrated in FIG. 2, the user could input the axis scale adjustment input by selecting one of the spin buttons 180 on the interface 100. The user would select the spin button 180 on the axis that the user was interested in and select either the increasing arrow or decreasing arrow at the upper or lower limit of the scale to indicate whether to increase or decrease the upper or lower limit. Alternatively, using the interface 100 illustrated in FIG. 2, the user could input the axis scale adjustment input by selecting one of the axis labels 185 along one of the axes A, B or C and move the axis label 185 to a new position on the axis corresponding to an increase or decrease of the upper or lower limit of the scale represented by the axis.

Figure 8A:
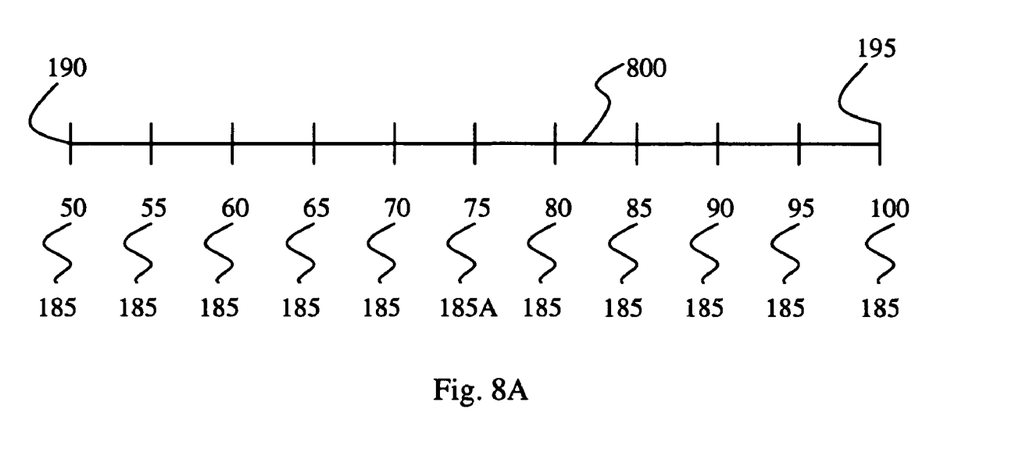
FIG. 8A illustrates an axis with an axis label moved to a first position.

FIG. 8A illustrates an axis 800 with an axis label 185A in a first position. FIG. 8A illustrates an axis 800 that indicates a scale with a lower limit 190 of 50 units and an upper limit 195 of 100 units with axis labels 185 at intervals of 5 units between the lower limit 190 and upper limit 195 indicated by axis labels 185.

Figure 8B:
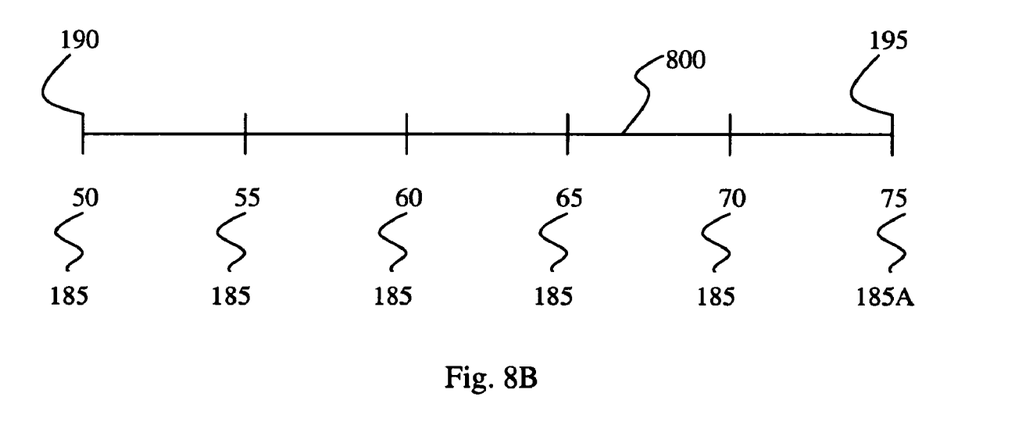
FIG. 8B illustrates the axis of FIG. 8A with the axis label moved to a second position.
Figure 8C:
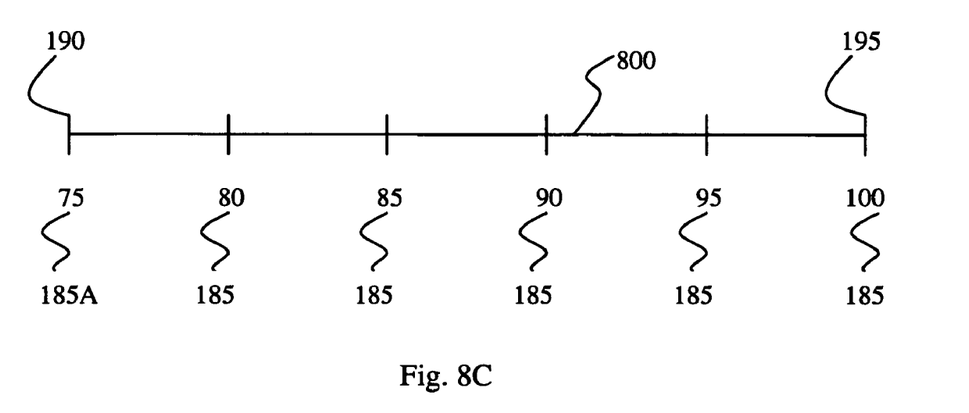
FIG. 8C illustrates the axis of FIG. 8A with the axis label moved to a different second position.

FIGS. 8B and 8C illustrate the axis label 185A in two possible second positions. FIG. 8B illustrates one embodiment of the invention when the axis label 185A indicating 75 units is moved by a user using an input device 5 or secondary input device 6 from the first position illustrated in FIG. 8A to a second position illustrated in FIG. 8B. In FIG. 8B, the lower limit 190 of the axis 800 remains 50 units, however, axis label 185A has been moved to the upper limit 195 and now axis label 185A indicates the upper limit 195 is now 75 units. Additionally, the increments illustrated between the unit intervals remain 5 units, however, they are spaced further apart to compensate for the scale showing a smaller range of values.

FIG. 8C illustrates the same embodiment with the axis label 185A moved to a different second position. In FIG. 8C, the axis label 185A has been moved to the lower limit 190 and the upper limit 195 remains 100.

Figure 8D:
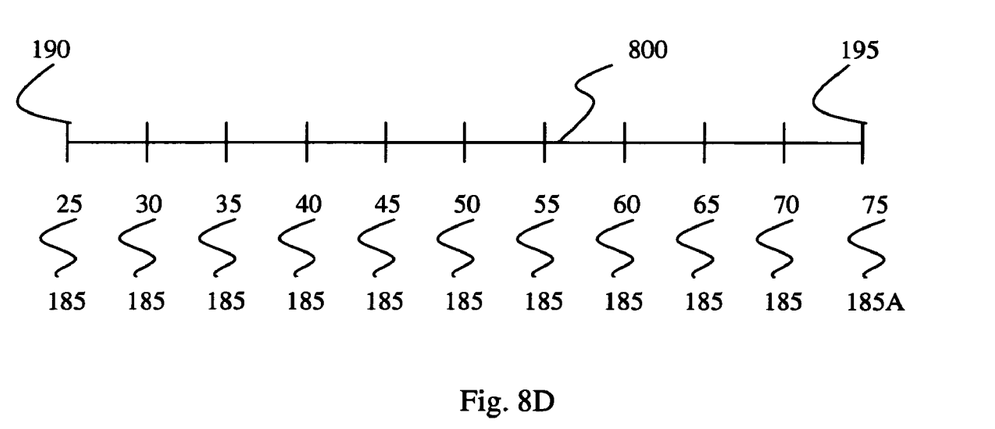
FIG. 8D illustrates the axis of FIG. 8A in another embodiment of the present invention with the axis label moved to a second position.

FIG. 8D illustrates another embodiment of a method of adjusting an axis in accordance with the present invention, whereby both the upper limit 195 and the lower limit 190 of the axis 800 are adjusted when the axis label 185A is moved from the first position illustrated in FIG. 8A to a second position illustrated in FIG. 8D. In this embodiment, both the upper limit 190 and lower limit 195 are adjusted in relation to the movement of the label axis 185A. In FIG. 8D, the lower limit 190 has become 25 and the upper limit 195 has become 75. It will be apparent to a person skilled in the present art that there are numerous methods the lower limit 190 and upper limit 195 can be adjusted corresponding to the movement of an axis label 185 to a new position.

Referring again to FIG. 7, the selected axis is displayed 720. The processing unit 3 will redisplay the selected axis on the display device 7. Depending on the axis scale adjustment input, either the upper limit or lower limit of the selected axis will be either increased or decreased. The scale represented by the selected axis is altered. The processing unit 3 will redisplay the axis so that the axis displays the correct scale and the values indicated on the selected axis are correct based on the increased or decreased upper or lower limit.

The grip will be displayed 730. The processing unit 3 will redisplay the grip on the selected axis on the display device 7. When the scale of the selected axis is adjusted, the grip on the selected axis may no longer indicate the value of the variable represented by the selected axis. The grip on the selected axis will be redisplayed on the display device 7 so that the grip indicates the correct value of the variable represented by the selected axis.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A method of providing a graphical representation of the relationship between a plurality of related variables, the method comprising:

displaying on a display device of a computer system a plurality of axes, including a first axis, a second axis and a third axis, each of the axes representing a numerical scale;

on the display device, displaying a first grip indicating on the first axis the value of a first variable, a second grip indicating on the second axis the value of a second variable, and a third grip indicating on the third axis the value of a third variable, wherein the grips are oriented at vertices of a triangle, and wherein each grip can be selectively locked to indicate that the value of a variable indicated by the locked grip is fixed such that the value remains constant until the locked grit) is unlocked;

receiving fixed variable input from a user locking only one of the first, second and third grips such that the value of the variable indicated by the locked grip is fixed such that the value remains constant until the locked grip is unlocked;

receiving variable adjustment input from the user comprising moving a chosen one of the unlocked grips from a first position on its corresponding axis to a second position on its corresponding axis;

using a value indicated by the chosen unlocked grip at the second, position on its corresponding axis as the changed value of its corresponding chosen variable to calculate a new value of a remaining variable;

displaying on the display device the remaining grip at a new position on its corresponding axis such that the remaining grip indicates the new value of the remaining variable;

receiving variable adjustment input from the user comprising moving the chosen unlocked grip from the second position on its corresponding axis to a third position on its corresponding axis;

using a value indicated by the chosen unlocked grip at the third position on its corresponding axis as the changed value of its corresponding chosen variable to calculate a further new value of the remaining variable; and displaying on the display device the remaining grip at a new position on its corresponding axis such that the remaining grip indicates the further new value of the remaining variable.

2. The method of claim 1 wherein the user moves the chosen unlocked grip from an initial position to a final position and comprising repeatedly calculating and displaying the value of the remaining variable as the value of the chosen variable changes as the selected unlocked grip moves along its corresponding axis from the initial position to the final position, such that the remaining grip moves along its corresponding axis substantially in concert with the selected unlocked grip.

3. The method of claim 1 comprising displaying on the display device lines connecting the first grip, second grip and third grip.

4. The method of claim 1 comprising: receiving variable unit conversion input from the user indicating a desire to convert a measurement unit of a selected one of the first, second, and third variables from a first measurement unit to a second measurement unit: displaying on the display device an axis that represents the selected variable such that such axis represents a scale in the second measurement units; converting the value of the selected variable from the first measurement unit to the second measurement unit; and displaying on the display device the grip on such axis at a location such that the grip indicates the value of the selected variable in the second measurement units.

5. The method of claim 1 comprising: receiving axis scale adjustment input from the user indicating a desire to change a limit of a selected one of the first, second, and third axes from a first limit to a second limit; displaying on the display device the selected axis with the desired limit; and displaying on the display device the grip on the selected axis.

6. The method of claim 5 wherein the axis scale adjustment input is input by the user selecting a spin button.

7. The method of claim 5 wherein the axis scale adjustment input is input by the user selecting an axis label on the selected axis and moving the axis label to a new position on the selected axis.

8. The method of claim 1 comprising displaying on the display device the numerical values of the first variable, second variable and third variable.

9. The method of claim 1 wherein two axes are parallel and tie other axis is perpendicular to the two parallel axes and extends between the two parallel axes.

10. The method of claim 1 comprising: displaying a fourth axis and a fourth grip indicating the value of a fourth variable; and receiving second fixed variable input from a user locking the fourth grip such that the value of the fourth grip is fixed, wherein the locked variable and fourth variable are known variables and when variable adjustment input is received from the user moving the chosen unlocked grip, the values indicated by the locked grip, chosen unlocked grip and fourth grip are used to calculate the new value of the remaining variable.

11. A computer readable memory having recorded thereon statements and instructions for execution by a computer to carry out the method of claim 1.

12. An apparatus for displaying a graphical representation of the relationship between a plurality of related variables, the apparatus comprising:
   a processing unit;
   a memory storage device operatively connected to the processing unit;
   an input device operatively connected to the processing unit wherein the input device is operative to receive input from a user and transmit the input to the processing unit;
   a display device operatively connected to the processing unit and operative to display an interface, the interface comprising:
      a plurality of axes, including a first axis, a second axis and a third axis. each of the axes representing a numerical scale; and a first grip indicating on the first axis the value of a first variable, a second grip indicating on the second axis the value of a second variable, and a third grip indicating on the third axis the value of a third variable, wherein the grips are oriented at vertices of a triangle and wherein each grip can be selectively locked to indicate that the value of a variable indicated by the locked grip is fixed such that the value remains constant until the locked grip is unlocked; and
      a program module stored in the memory storage device operative for providing instructions to the processing unit, the processing unit responsive to the instructions of the program module;
   wherein the processing unit is operative to:
      receive fixed variable input from the input device locking only one of the first, second and third grips such that the value of the variable indicated by the locked tip is fixed and remains constant until the locked tip is unlocked;
      receive variable adjustment input from the input device comprising moving a chosen one of the unlocked grips from a first position on its corresponding axis to a second position on its corresponding axis indicating a changed value of its corresponding chosen variable;
      calculate a new value of a remaining variable using the changed value of the chosen variable;
      display on the display device the remaining grip at a new position on its corresponding axis such that the remaining grip indicates the new value of the remaining variable;
      receive variable adjustment input from the input device comprising moving the chosen unlocked grips from the second position on its corresponding axis to a third position on its corresponding axis indicating a further changed value of its corresponding chosen variable;
      calculate a further new value of the remaining variable using the further changed value of the chosen variable; and
      display on the display device the remaining grip at a further new position on its corresponding axis such that the remaining grip indicates the further new value of the remaining variable.

13. The apparatus of claim 12 wherein the user moves the chosen unlocked grip from an initial position using the input device and the processing unit is operative to repeatedly calculate and display on the display device the value of the remaining variable as the value of the chosen variable changes as the selected unlocked grip moves along its corresponding axis from the initial position to the final position, such that the remaining grip moves along its corresponding axis substantially in concert with the elected unlocked grip.

14. The apparatus of claim 12 wherein the processing unit is operative to display on the display device lines connecting the first grip, second grip and third grip.

15. The apparatus of claim 12 wherein the processing unit is operative to: receive variable unit conversion input from the input device indicating a desire to convert a measurement unit of a selected one of the first, second, and third variables from a first measurement unit to a second measurement unit: display on the display device an axis that represents the selected variable such that such axis represents a scale in the second measurement units; convert the value of the selected variable from the first measurement unit to the second measurement unit; and display on the display device the grip on such axis at a location such that the grip indicates the value of the selected variable in the second measurement units.

16. The apparatus of claim 12 wherein the processing unit is operative to: receive axis scale adjustment input from the input device indicating a desire to change a limit of a selected one of the first, second, and third axes from a first limit to a second limit; display on the display device the selected axis with the desired limit; and display on the display device the grip on the selected axis.

17. The apparatus of claim 16 wherein the axis scale adjustment input is input by the user selecting a spin button.

18. The apparatus of claim 16 wherein the axis scale adjustment input is input by the user selecting an axis label on the selected axis and moving the axis label to a new position on the selected axis.

19. The apparatus of claim 12 wherein the display device is operative to display the numerical values of the first variable, second variable and third variable.

20. The apparatus of claim 12 wherein the display device displays two axes in parallel and the other axis perpendicular to the two parallel axes and extending between the two parallel axes.

21. The apparatus of claim 12 wherein the processing unit is operative to: display a fourth axis and a fourth grip indicating the value of a fourth variable; and receive second fixed variable input from a user locking the fourth grip such that the value of the fourth grip is fixed, wherein the locked variable and fourth variable are known variables and when variable adjustment input is received from the user moving the chosen unlocked grip, the values indicated by the locked grip, chosen unlocked grip and fourth grip are used to calculate the new value of the remaining variable.

* * * * *